US012692962B1

(12) United States Patent
Parkin et al.

(10) Patent No.: US 12,692,962 B1
(45) Date of Patent: Jul. 28, 2026

(54) SPRING COLLAR SHOULDER

(71) Applicant: Schlumberger Technology Corporation, Sugar Land, TX (US)

(72) Inventors: Edward George Parkin, Stonehouse (GB); Keith Lathan, Herefordshire (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/089,114

(22) Filed: Mar. 25, 2025

(51) Int. Cl.
| | |
|---|---|
| *F16L 37/098* | (2006.01) |
| *F16L 37/091* | (2006.01) |
| *E21B 17/16* | (2006.01) |

(52) U.S. Cl.
CPC ........... F16L 37/098 (2013.01); F16L 37/091 (2013.01); *E21B 17/16* (2013.01)

(58) Field of Classification Search
CPC ... F16L 37/098; F16L 37/0982; F16L 37/091; F16L 37/096; F16L 37/0985; F16L 37/12; F16L 37/133; E21B 17/16
USPC ....................................................... 285/322
See application file for complete search history.

(56) References Cited

U.S. PATENT DOCUMENTS

| | | | | |
|---|---|---|---|---|
| 295,408 | A * | 3/1884 | Kerr | B23B 31/12 |
| | | | | 285/322 |
| 3,100,537 | A * | 8/1963 | Crowe | E21B 34/14 |
| | | | | 166/330 |
| 3,497,243 | A * | 2/1970 | Gruller | E21B 33/043 |
| | | | | 285/322 |
| 4,280,561 | A * | 7/1981 | Fredd | E21B 34/14 |
| | | | | 251/297 |
| 4,512,406 | A * | 4/1985 | Vann | E21B 43/116 |
| | | | | 166/318 |
| 5,398,763 | A * | 3/1995 | Watson | E21B 23/02 |
| | | | | 166/242.6 |
| 5,600,694 | A * | 2/1997 | Broders | G21C 3/334 |
| | | | | 376/451 |
| 5,806,898 | A * | 9/1998 | Hollnagle | F16L 37/098 |
| | | | | 285/86 |
| 2008/0252071 | A1 * | 10/2008 | Lechner | F16L 37/098 |
| | | | | 285/319 |
| 2016/0238171 | A1 * | 8/2016 | Galfre' | F16L 37/0985 |
| 2019/0049050 | A1 * | 2/2019 | Wu | F16L 37/091 |
| 2023/0417350 | A1 * | 12/2023 | Fillo | F16L 37/0985 |

FOREIGN PATENT DOCUMENTS

JP         2007333108 A   * 12/2007   ........... F16L 37/098

* cited by examiner

*Primary Examiner* — David Bochna
(74) *Attorney, Agent, or Firm* — Jeffrey D. Frantz

(57) ABSTRACT

A spring shoulder kit includes an expanding shoulder and a retaining sleeve. The expanding shoulder includes a wedge outwardly radially extending from a radially flexible finger. The retaining sleeve is slidably insertable into the expanding shoulder to block inward radial movement of the wedge.

19 Claims, 9 Drawing Sheets

SPRING COLLAR SHOULDER

CROSS-REFERENCES TO RELATED APPLICATIONS

None.

BACKGROUND

Collars often use repeated reductions in the inner diameter of the collar to act as internal shoulders against which internal assemblies are loaded. Consequently, the collar becomes increasingly narrow from one end to another, limiting the number and size of internal assemblies that may be installed in the collar.

SUMMARY

In one independent aspect, a spring shoulder kit includes an expanding shoulder and a retaining sleeve. The expanding shoulder includes a wedge outwardly radially extending from a radially flexible finger. The retaining sleeve is slidably insertable into the expanding shoulder to block inward radial movement of the wedge.

In some embodiments, the retaining sleeve is sized to outwardly radially expand the finger.

In some embodiments, the finger is one of a plurality of fingers radially arranged about a longitudinal axis of the expanding shoulder, and the wedge is one of a plurality of wedges, each wedge of the plurality of wedges respectively outwardly radially extending from one of the plurality of fingers.

In some embodiments, the wedge has a plateau connected to an upper chamfer and a lower chamfer.

In some embodiments, the finger has a lead-in feature configured to facilitate insertion of the retaining sleeve into the expanding shoulder.

In some embodiments, the wedge is circumferentially wider than the finger.

In some embodiments, a cylindrical wall of the retaining sleeve slidably engages the finger.

In some embodiments, in a locked state, an end of a cylindrical wall of the retaining sleeve abuts an internal shoulder of the expanding shoulder.

In some embodiments, a cylindrical wall of the retaining sleeve has an outer diameter sized to engage a tip of the finger when the expanding shoulder is in a compressed state.

In some embodiments, when the expanding shoulder is in a compressed state within a collar, the retaining sleeve is useable as a tool to axially push the expanding shoulder along the collar.

In some embodiments, in a locked state within a collar, an outwardly radially extending flange of the retaining sleeve abuts a tip of the finger.

In some embodiments, the wedge is configured to matingly fit into a groove defined in a collar.

In some embodiments, the finger is thinner in wall thickness than a ring of the expanding shoulder.

In some embodiments, the finger extends axially from a ring.

In some embodiments, in a relaxed state, the wedge extends radially outwardly further than a ring of the expanding shoulder.

In another independent aspect, a collar assembly includes a collar and a spring shoulder kit. The collar defines an internal groove. The spring shoulder kit is selectively removably placeable within the collar. The spring shoulder kit includes an expanding shoulder including an outwardly radially extending wedge, and a retaining sleeve configured to outwardly radially hold the wedge in the internal groove.

In some embodiments, when the expanding shoulder is in a locked state with the wedge snapped into the groove, the retaining sleeve is slidably insertable into the expanding shoulder.

In some embodiments, the expanding shoulder snappably and matingly engages the collar via the wedge.

In another independent aspect, a method for placing an internal shoulder in a collar includes axially inserting an expanding shoulder into the collar until a wedge of the expanding shoulder radially outwardly snaps into an internal groove defined in the collar; and inserting a retaining sleeve into the expanding shoulder to outwardly radially hold the wedge in the internal groove.

In some embodiments, the wedge matingly fits into the groove.

BRIEF DESCRIPTION OF THE DRAWINGS

The accompanying drawings, which are incorporated in and form a part of this specification, illustrate embodiments of the disclosure and, together with the description, serve to explain the principles of embodiments of the disclosure.

DETAILED DESCRIPTION

Figure 1:
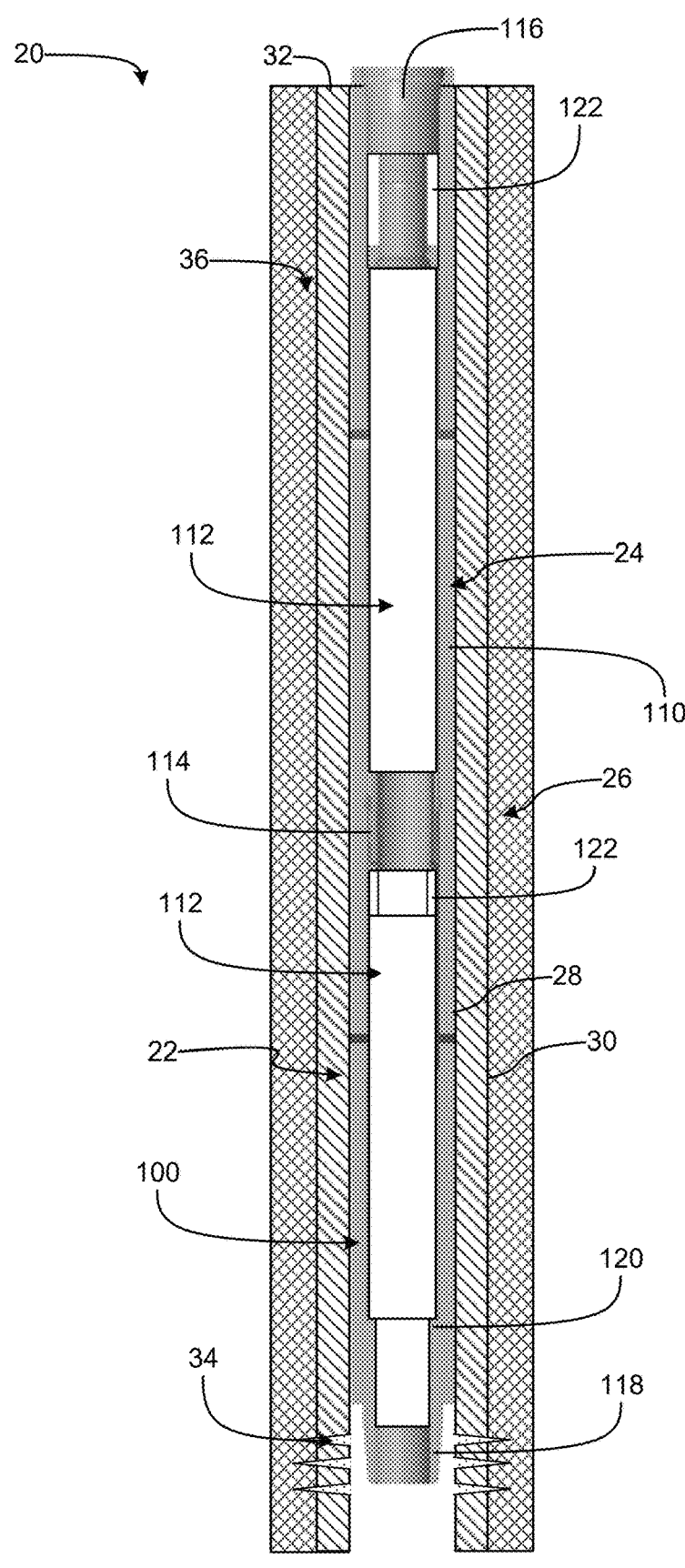
FIG. 1 is a cross-sectional view of a well system, according to an embodiment.

Various modifications to the illustrated embodiments will be readily apparent to those skilled in the art, and the generic principles herein can be applied to other embodiments and applications. Thus, it is to be understood that the disclosure is not limited in its application to the details of the configuration and arrangement of components set forth in the following description or illustrated in the accompanying drawings. The disclosure is capable of being practiced or of being carried out in various ways and is to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosure. Skilled artisans will recognize the examples provided herein have many useful alternatives and fall within the scope of the disclosure.

Before any embodiments are explained in detail, it is to be understood that the disclosure is not limited in its application to the details of construction and the arrangement of components set forth in the following description or illustrated in the attached drawings. The disclosure is capable of other embodiments and of being practiced or of being carried out in various ways. Also, it is to be understood that the phraseology and terminology used herein are for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise specified or limited, "at least one of A, B, and C," and similar other phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the categories A, B, and/or C.

As mentioned above, current devices and methods to form shoulders inside collars are inadequate and inefficient. Thus, it would be useful to provide more sophisticated and versatile devices and methods to form retaining shoulders for internal assemblies inside a collar.

In overview of the present teaching, collars often use a reduction in an inner diameter of the collar to act as a shoulder against which internal assemblies are loaded. When multiple shoulders are needed to axially retain various internal assemblies in the collar, the inner diameter of the collar is repeatedly reduced along a length of the collar. Thus, the outer diameter of an internal assembly that will fit in a lowermost end of the collar is limited and/or reduced.

The disclosure provides a selectively placeable, removable internal spring shoulder kit. Before installation of the spring shoulder kit, one or more internal grooves are cut into a collar. Further, a first internal assembly may be loaded into the collar from a top opening and inserted axially along the collar until the internal assembly contacts a lowermost shoulder of the collar. A first jam nut may then be threaded into the collar to retain the first internal assembly against the lowermost shoulder.

In operation, an expanding shoulder is pushed into the collar from the top opening until spring fingers of the expanding shoulder snap outwardly into the groove axially above the internal assembly. Further in operation, a retaining sleeve is inserted into the expanding shoulder, which radially locks the expanding shoulder in place against the collar. Thus, a second internal assembly is axially placed against the spring shoulder kit. A second jam nut may then be threaded into the collar to retain the second internal assembly against the spring shoulder kit. In some instances, the expanding shoulder is axially pushed in the collar using a tool. In some instances, the expanding shoulder is axially pushed in the collar using the retaining sleeve.

This process may be repeated to load further additional internal assemblies into the collar, which are retained between additional spring shoulder kits and jam nuts. It should be appreciated that by using the spring shoulder kits, the internal assemblies loaded into the collar may be equal in outer diameter, instead of being subsequently reduced in outer diameter axially along the collar from the top opening to the lowermost shoulder. In some instances, where an off-the-shelf internal assembly is smaller in diameter than the inner diameter of collar, a spacer may be placed around the off-the-shelf internal assembly to match the inner diameter of the collar.

More specifically, the expanding shoulder includes a solid ring at a lower end and multiple long thin spring fingers extending axially upwardly from the solid ring. The spring fingers are configured to flex easily radially inwardly and outwardly and each have a wedge-shaped upper end that mates with the groove in the collar. The upper ends may have a shallow-angled outer chamfer. Thus, as the expanding shoulder is moved axially upwardly during removal, the spring fingers slide against the collar and are compressed radially inwardly out of the groove, freeing the upper ends from the groove. Slots are defined between the spring fingers and sized to allow the spring fingers to radially bend during assembly and disassembly, even when debris (e.g., mud, cuttings, particles) have seeped into the slots.

Further, in some embodiments, the retaining sleeve is included in an internal assembly. Additionally, an uppermost jam nut and/or a spring pack may be installed into the collar near the top opening to hold an axially uppermost internal assembly against an axially uppermost spring shoulder kit.

In some embodiments, the expanding shoulder defines slots having openings alternately at an upper end and a lower end. Thus, in some embodiments, the spring fingers are connected to one another along an undulating, serpentine, and/or zigzag path.

In some embodiments, O-rings may be placed variously between the collar, the retaining sleeve, and/or the solid ring of the expanding shoulder to keep the spring shoulder kit and/or the internal assemblies clean.

Referring generally to FIG. 1, a first example well system 20 is illustrated. By way of example, a casing 22 may be disposed along a wellbore 24 drilled into a subterranean formation 26. In some well applications, the well casing 22 is metallic. The casing 22 has an interior surface 28, an exterior surface 30. Additionally, the casing 22 includes a wellhead 32 and defines perforations 34. The well system 20 further includes a collar assembly 100 disposed within the casing 22 and/or the wellbore 24. In some embodiments, the collar assembly 100 is substantially circular in cross-section. In other examples, the casing 22 is omitted and the collar assembly 100 is inserted into the wellbore 24 in direct contact with the subterranean formation 26.

Remaining with FIG. 1, the collar assembly 100 includes a collar 110, one or more internal assemblies 112, and a spring shoulder kit 114. The collar assembly 100 includes an upper threaded connector 116, a lower threaded connector 118, a lower shoulder 120, and a jam nut 122. The spring shoulder kit 114 axially retains one or more of the internal assemblies 112 against the lower shoulder 120. Similarly, the jam nut 122 axially retains one or more of the internal assemblies 112 against the spring shoulder kit 114. Multiple collars 110 may linked to one another via the upper threaded connector 116 and the lower threaded connector 118.

Figure 2:
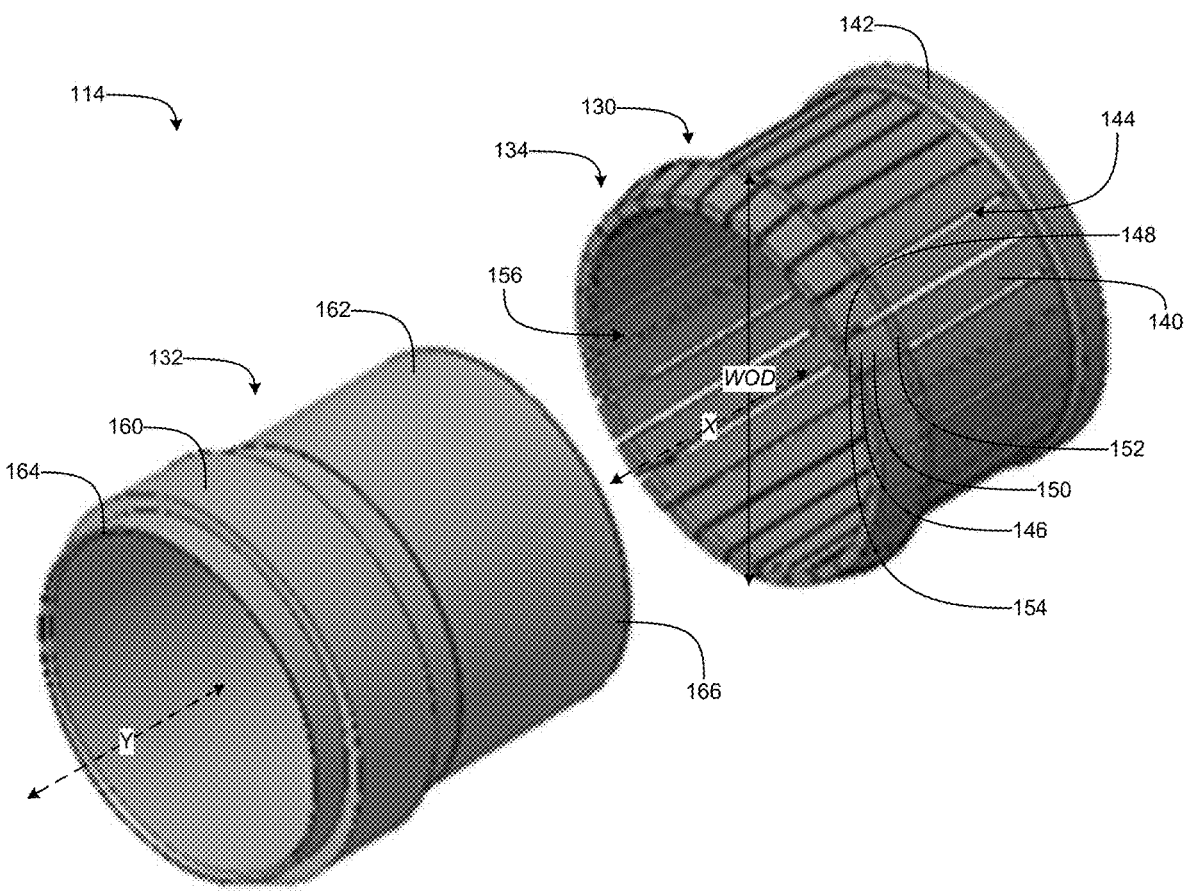
FIG. 2 is an exploded view of a spring shoulder kit of the well system of FIG. 1.

Turning to FIG. 2, the spring shoulder kit 114 includes an expanding shoulder 130 and a retaining sleeve 132. The expanding shoulder 130 and the retaining sleeve 132 are generally cylindrical. The expanding shoulder 130 is configured to slidably receive the retaining sleeve 132. Further, the retaining sleeve 132 mateably seats in the expanding shoulder 130, as will be explained in greater detail below. In the example of FIG. 2, the expanding shoulder 130 is illustrated in a relaxed state 134.

More specifically, the expanding shoulder 130 includes a plurality of spring fingers 140 extending axially from a lower ring 142. The spring fingers 140 are resiliently pivotable relative to the lower ring 142. The plurality of spring fingers 140 are arranged about a first longitudinal axis X and are spaced apart from one another to define a plurality of spaces 144. In some embodiments, the spring fingers 140 are arranged regularly about the first longitudinal axis X. In some embodiments, the spring fingers 140 are arranged irregularly about the first longitudinal axis X. In some embodiments, the spring fingers 140 are substantially equal in width. In some embodiments, the spring fingers 140 vary in width. The spaces 144 may be variously narrower, substantially equal, and/or wider in width than the spring fingers 140. A wedge 146 extends radially outwardly from each of the spring fingers 140 at an upper end 148. Each wedge 146 includes an upper chamfer 150 and a lower side 152. Further, each spring finger 140 has an upper tip 154. The expanding shoulder 130 defines a first passage 156. The wedges 146 collectively define a wedge outer diameter WOD. It should be appreciated that because the spring fingers 140 are flexible, the wedge outer diameter WOD is variable, as will be explained in greater detail below.

Additionally, the retaining sleeve 132 includes a flange 160 extending radially outwardly from a cylindrical wall 162 between an upper end 164 and a lower end 166. The retaining sleeve defines a second longitudinal axis Y and a second passage 168.

Figure 3:
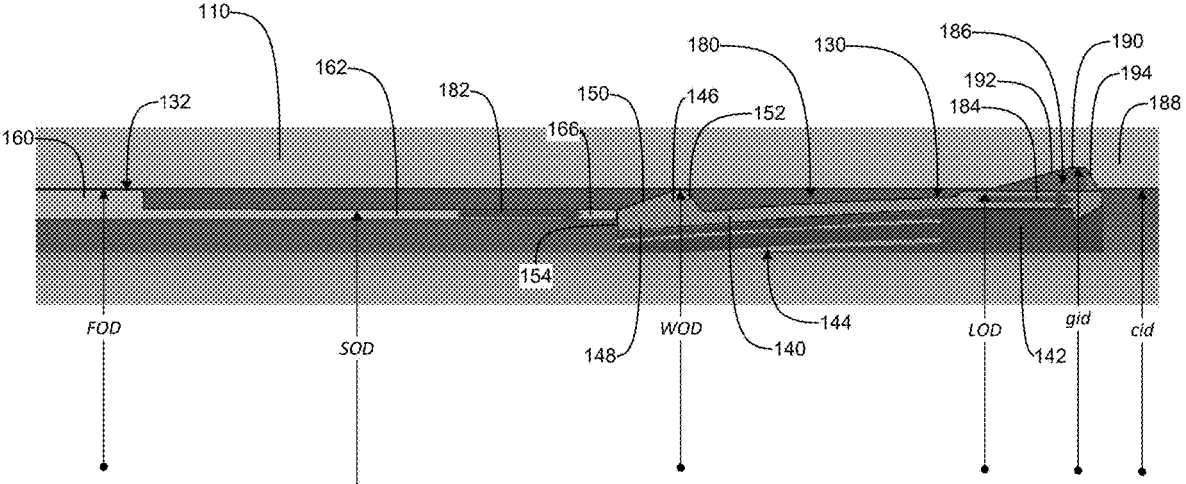
FIG. 3 is a partial cross-sectional view of the spring shoulder kit of FIG. 2 being installed in a collar of the well system of FIG. 1.

With reference to FIG. 3, during installation, the retaining sleeve 132 may be used to push the expanding shoulder 130 in a compressed state 180 axially downwardly along the collar 110, as indicated by arrows 182, 184. More specifically, the flange 160 has a flange outer diameter FOD sized to slidably engage a collar inner diameter cid of the collar 110. The cylindrical wall 162 has a sleeve outer diameter SOD sized to axially abut and/or engage the expanding shoulder 130 in the compressed state 180. Thus, the lower end 166 contacts the upper tips 154 to push the expanding shoulder 130 toward a groove 186 defined in a cylindrical wall 188 of the collar 110.

The groove 186 is configured and sized to mateably receive the wedges 146 of the expanding shoulder 130. More specifically, the groove 186 is defined by a seat 190 that has a groove inner diameter gid and is connected to an upper ramp 192 and a lower ramp 194. The groove diameter gid is greater than the collar inner diameter cid.

Further, the lower ring 142 has lower outer diameter LOD sized to slidably engage the collar inner diameter cid. In some embodiments, the lower ring 142 is thicker in wall thickness than the spring fingers 140. In the relaxed state 134 (shown in FIG. 2), the wedge outer diameter WOD is greater than the collar inner diameter cid. Thus, when the expanding shoulder 130 is introduced and inserted into the collar 110, the lower sides 152 of the wedges 146 encounter the collar inner diameter cid and transfer the axial pushing force of the retaining sleeve 132 to radially resiliently bend the spring fingers 140 relative to the lower ring 142. More specifically, as the expanding shoulder 130 is pushed into the collar 110, the spring fingers 140 are compressed toward one another, thus narrowing and/or closing the spaces 144 at the upper end 148. Thus, the wedges 146 act as lead-in features to facilitate insertion of the expanding shoulder 130 into the collar 110.

Figure 4:
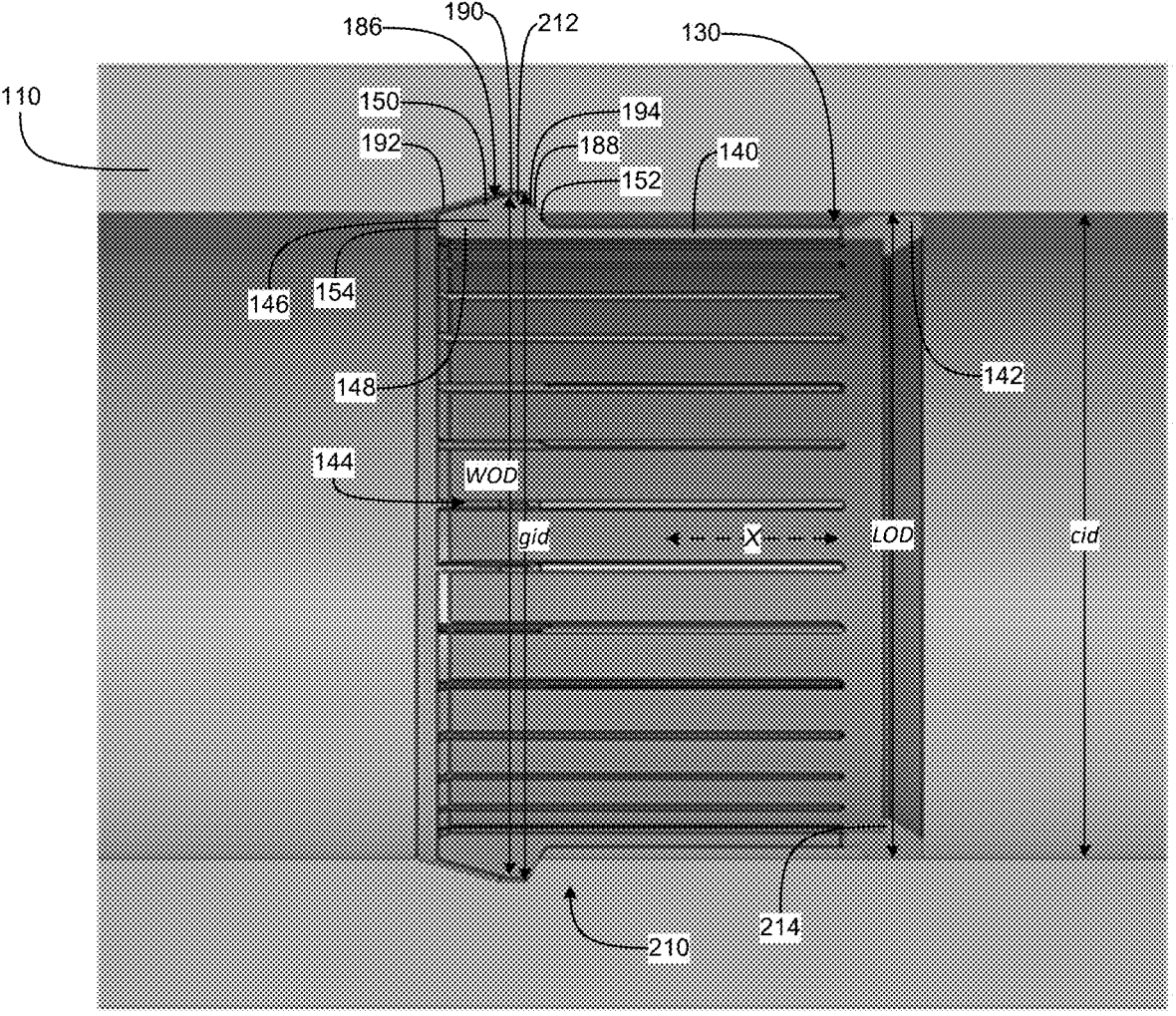
FIG. 4 is a cross-sectional view of an expanding shoulder of the spring shoulder kit of FIG. 2 installed in the collar of FIG. 3.

Turning to FIG. 4, in an installed state 210, the wedges 146 are radially outwardly matingly snapped into the groove 186. More specifically, the upper chamfers 150 and the lower sides 152 mate with the upper ramp 192 and the lower ramp 194, respectively. It should be understood that the lower sides 152 may form any angle relative to the spring fingers 140. Thus, the lower sides 152 may form chamfers, shoulders, hooks, barbs, etc. relative to the spring fingers 140. Further, plateaus 212 of the wedges 146 respectively connected to the upper chamfers 150 and the lower sides 152 mate into the seat 190. It should be understood that, in some embodiments, in the installed state 210, the spring fingers 140 are not fully returned to the relaxed state 134 (shown in FIG. 3) and thus remain under radial compression by the collar 110 via the wedges 146.

In some instances, one or more tools (not shown) may abut and/or be engaged with the upper tips 154 and/or an internal shoulder 214 of the lower ring 142 to further axially downwardly push the expanding shoulder along the collar 110 (e.g., toward a lower groove). As the tools push on the expanding shoulder 130, the lower sides 152 ride against the lower ramp 194, which transfer the axial pushing force of the tools to again radially compress the spring fingers 140 and free the wedges 146 from the groove 186.

Figure 5:
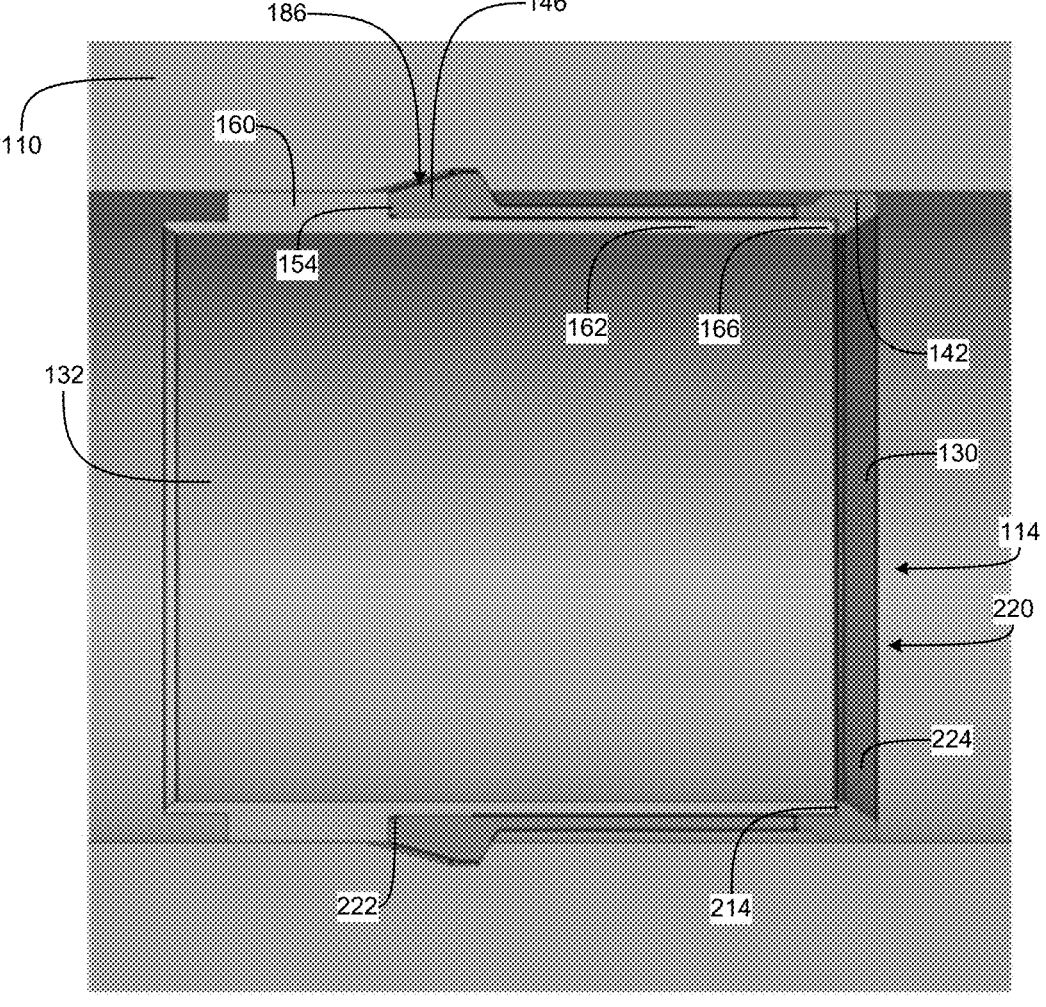
FIG. 5 is a cross-sectional view of the spring shoulder kit of FIG. 2 installed in the collar of FIG. 3.

Turning to FIG. 5, in a locked state 220, the retaining sleeve 132 is axially slidably inserted into the expanding shoulder 130. More specifically, the flange 160 and the lower end 166 axially abut and/or engage the upper tips 154 and the internal shoulder 214. Further, the cylindrical wall 162 radially supports, blocks, and/or expands the wedges 146 into the groove 186. Thus, because the cylindrical wall 162 prevents the spring fingers 140 from radially inwardly flexing relative to the lower ring 142, the wedges 146 are captured in the groove 186, which axially locks the expanding shoulder 130 relative to the collar 110. In some embodiments, the spring fingers 140 each have a lead-in feature 222 (e.g., chamfer, radius, fillet, etc.) to facilitate insertion of the retaining sleeve 132 into the expanding shoulder 130. Additionally, in some embodiments, the lower ring 142 has an internal chamfer 224.

In an alternative embodiment (not shown), in a relaxed state, the spring fingers 140 are bent relative to the lower ring 142 such that the wedge outer diameter WOD is less than or equal to the collar inner diameter cid. Thus, in the alternative relaxed state, the spring fingers 140 are near and/or contact one another at the upper end 148, consequently narrowing and/or closing the spaces 144 at the upper end 148. Further, in the alternative relaxed state, when the expanding shoulder (not shown) is introduced and inserted into the collar 110, the lower sides 152 of the wedges 146 slide along the collar inner diameter cid. Thus, in the alternative embodiment, only once the retaining sleeve 132 is inserted into the expanding shoulder 130 are the wedges 146 introduced and pushed outwardly into the groove 186.

Figure 6:
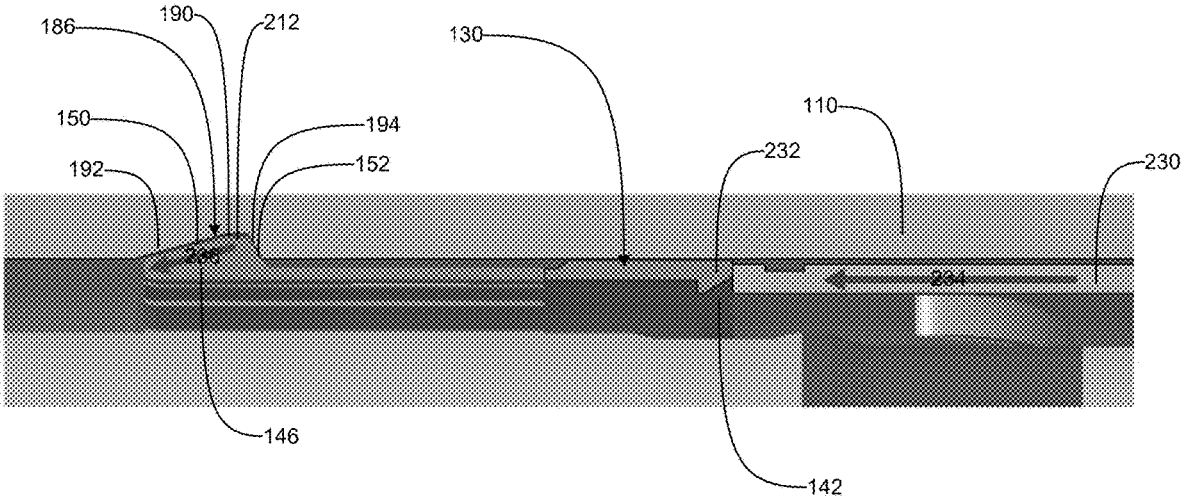
FIG. 6 is a partial cross-sectional view of the expanding shoulder of FIG. 4 being removed from the collar of FIG. 3.

Turning to FIG. 6, to remove the expanding shoulder 130 from the collar 110, a tool 230 may abut and/or be engaged with a lower end 232 of the expanding shoulder 130 to axially upwardly push the expanding shoulder 130 along the collar 110, as indicated by arrow 234. As the tool 230 pushes on the expanding shoulder 130, the upper chamfers 150 ride against the upper ramp 192, which transfer the axial pushing force of the tool 230 to again radially compress the spring fingers 140 and free the wedges 146 from the groove 186, as indicated by arrow 236.

Figure 7:
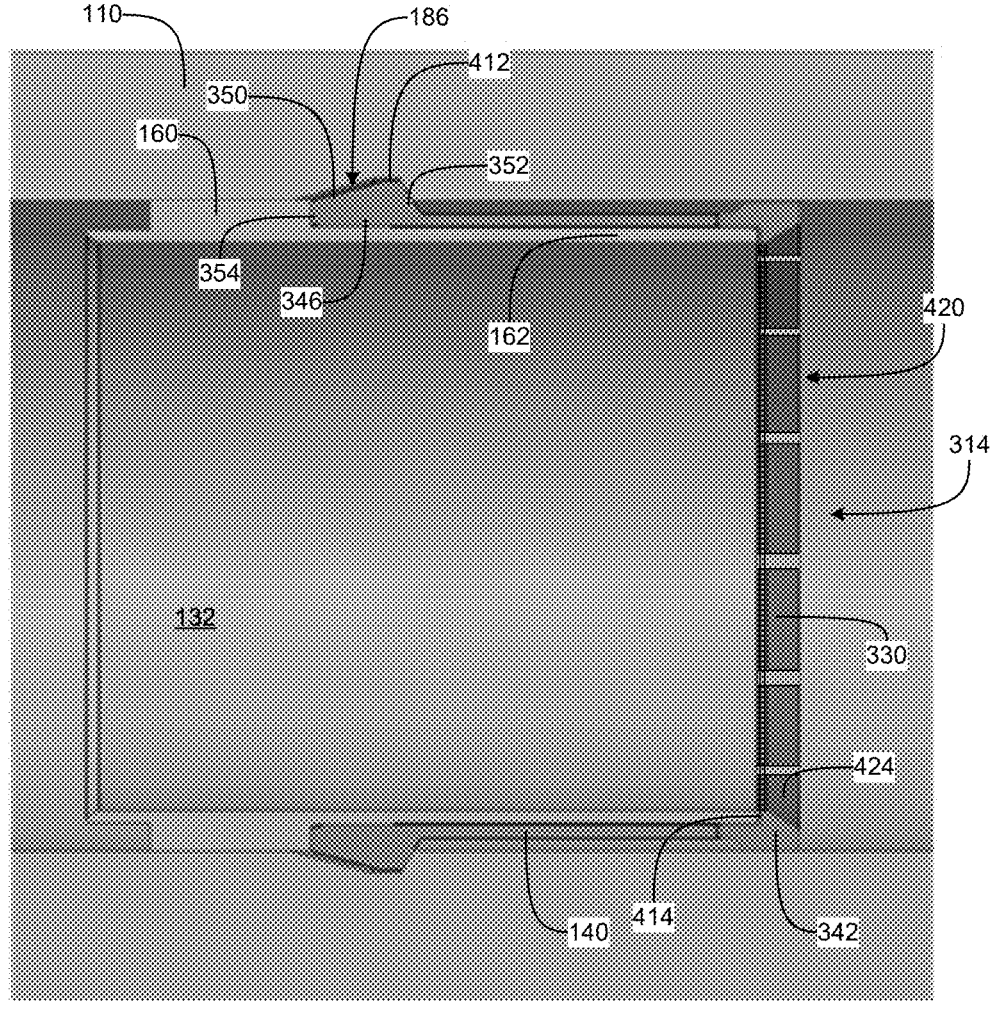
FIG. 7 is a cross-sectional view of a spring shoulder kit according to another embodiment installed in the collar of FIG. 3.

With reference to FIG. 7, a spring shoulder kit 314 according to another embodiment includes an expanding shoulder 330 and the retaining sleeve 132. The expanding shoulder 330 includes the spring fingers 140, a plurality of lower segments 342, a plurality of wedges 346, and an upper end 354. Each wedge 346 includes a plateau 412 connected to an upper chamfer 350 and a lower chamfer 352, which radially outwardly matingly snap into the groove 186 in the same manner as the wedges 146 explained above. Additionally, each lower segment 342 defines an internal shoulder 414.

Further, in a locked state 420, the retaining sleeve 132 is axially slidably inserted into the expanding shoulder 330. More specifically, the flange 160 and the lower end 166 axially abut and/or engage the upper end 354 and the internal shoulders 414. Further, the cylindrical wall 162 radially supports, blocks, and/or expands the wedges 346 into the groove 186. Thus, because the cylindrical wall 162 prevents the spring fingers 140 from radially inwardly flexing relative to the lower segments 342, the wedges 346 are captured in the groove 186, which axially locks the expanding shoulder 330 relative to the collar 110. In some embodiments, the lower segments 342 each have an internal chamfer 424.

Figure 8:
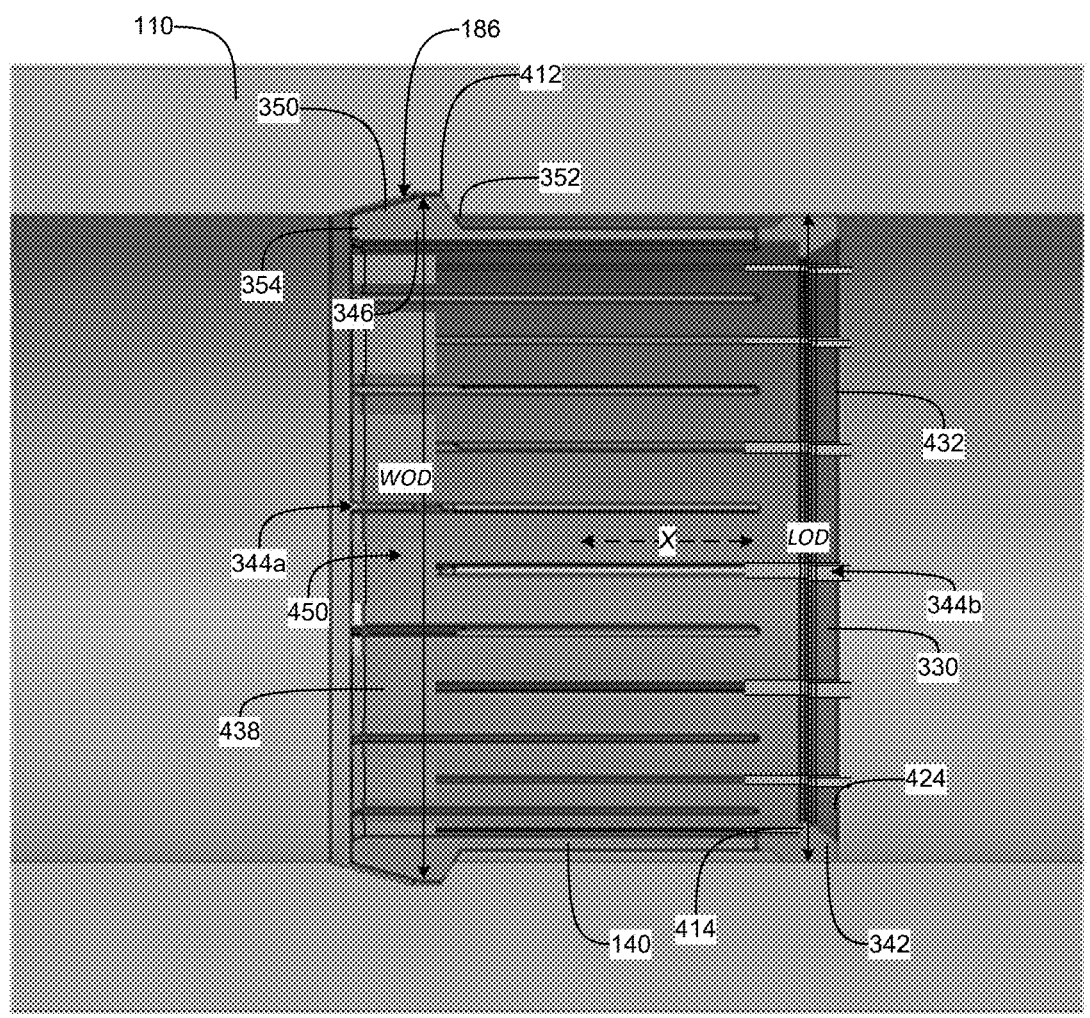
FIG. 8 is a cross-sectional view of an expanding shoulder of the spring shoulder kit FIG. 7 installed in the collar of FIG. 3.

Turning to FIG. 8, the spring fingers 140 are alternatingly resiliently pivotably connected to one another at the upper end 354 and a lower end 432 via upper bridges 438 and the lower segments 342. Thus, the spring fingers 140 and the lower segments 342 define upwardly opening spaces 344*a*. Similarly, the spring fingers 140 and the upper bridges 438 define downwardly opening spaces 344*b*. Consequently, the spring fingers 140, the lower segments 342, and the upper bridges 438 follow an undulating, serpentine, and/or zigzag pattern. The wedges 346 extend radially outwardly from the spring fingers 140 and the upper bridges 438.

Additionally, the expanding shoulder 530 defines a first passage 450. The wedges 346 collectively define a wedge outer diameter WOD. Similarly, the lower segments 342 collectively define a lower outer diameter LOD. It should be appreciated that because the spring fingers 140, the lower segments 342, and the upper bridges 438 are flexible, the wedge outer diameter WOD and the lower outer diameter LOD are variable.

Figure 9:
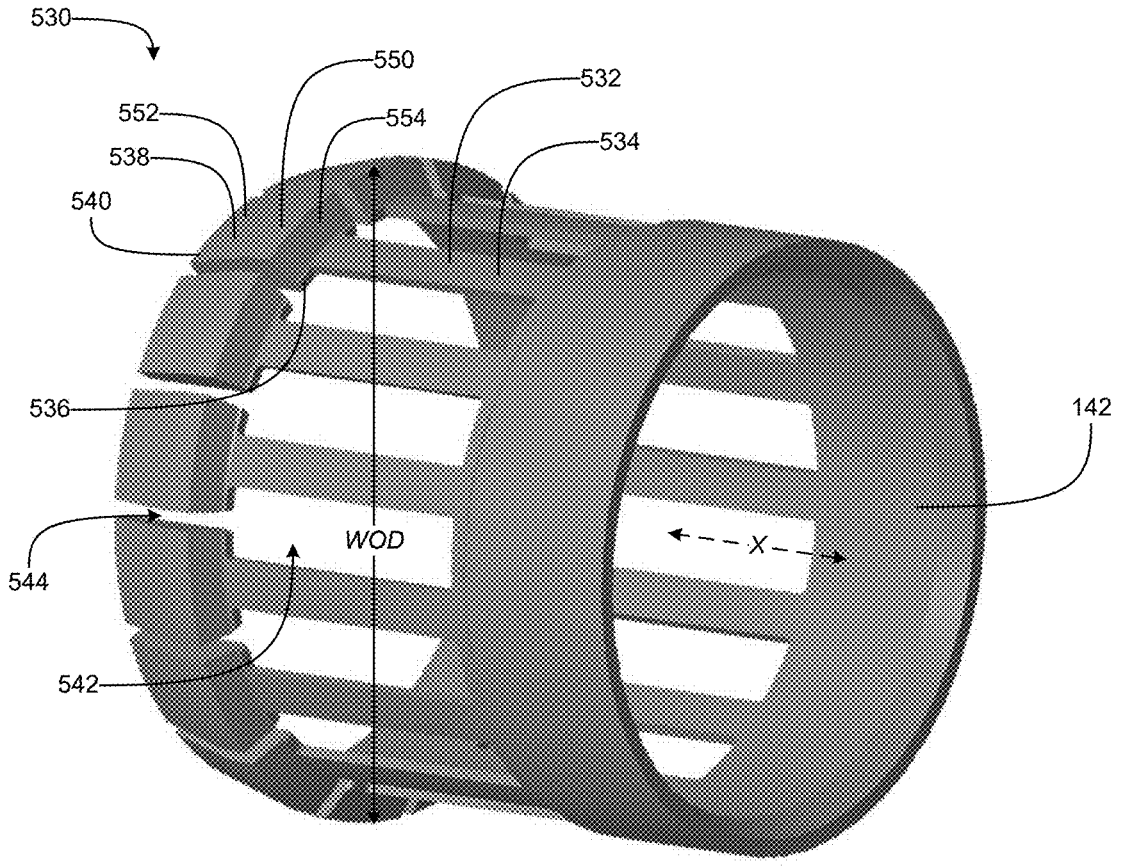
FIG. 9 is an isometric view of an expanding shoulder according to another embodiment.

With reference to FIG. 9, an expanding shoulder 530 according to another embodiment includes a plurality of spring paddles 532 extending axially from the lower ring 142. The spring paddles 532 are resiliently pivotable relative to the lower ring 142 and are arranged about a first longitudinal axis X. Each spring paddle 532 includes a stalk 534 connected to a plate 536 and the lower ring 142. The plates 536 are wider than the stalks 534. A wedge 538 extends radially outwardly from each plate 536 at an upper end 540. Thus, the stalks 534 define a plurality of first spaces 542 relative to one another. Similarly, the plates 536 and the wedges 538 define a plurality of second spaces 544 relative to one another. Consequently, the first spaces 542 are wider than the second spaces 544. In some embodiments, the spring paddles 532 are arranged regularly about the first longitudinal axis X. In some embodiments, the spring paddles 532 are arranged irregularly about the first longitudinal axis X. In some embodiments, the stalks 534 are substantially equal in width. In some embodiments, the plates 536 are substantially equal in width. In some embodiments, the stalks 534 and/or the plates 536 vary in width. In some embodiments, the stalk 534 is medially aligned and/or centered relative to the plate 536. In some embodiments, the plate 536 is offset relative to the stalk 534.

Further, in some embodiments, each wedge 538 includes a plateau 550 connected to an upper chamfer 552 and a lower side 554. Alternatively, in some embodiments, the upper chamfer 552 is directly connected to the lower side

554. Further, each spring paddle 532 has an upper tip. The expanding shoulder 530 defines a first passage. The wedges 538 collectively define a wedge outer diameter WOD. It should be appreciated that because the spring paddles 532 are flexible, the wedge outer diameter WOD is variable, in the same manner as the spring fingers 140, explained above.

In an alternative embodiment (not shown), the internal shoulder 214 extends inwardly from the spring fingers 140. Thus, during installation, the alternative expanding shoulder is introduced to the collar 110 via the spring fingers 140. Consequently, when the retaining sleeve 132 is inserted into the alternative expanding shoulder, the lower end 166 first encounters the lower ring 142 and then expands the spring fingers 140 into the groove 186.

In other embodiments, other configurations are possible. For example, those of skill in the art will recognize, according to the principles and concepts disclosed herein, that various combinations, sub-combinations, and substitutions of the components discussed above can provide improved collar assemblies.

The above description of the disclosed embodiments is provided to enable any person skilled in the art to make or use one or more aspects of the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A spring shoulder kit comprising:
   an expanding shoulder insertable into an inner wall of a collar disposed in a wellbore, the expanding shoulder including:
   a ring;
   a finger axially extending from and flexibly pivotable relative to the ring, the finger having a first end; and
   a wedge outwardly radially extending from the finger at the first end, the wedge being configured to matingly radially outwardly snap into a groove defined in the inner wall of the collar; and
   a retaining sleeve slidably insertable into the expanding shoulder along the finger to block inward radial movement of the wedge,
   wherein the spring shoulder kit is configured to support an axial load of an internal assembly in the collar disposed in the wellbore, and the spring shoulder kit is configured to be positioned completely inside the collar between opposite axial ends of the collar, and
   wherein the retaining sleeve comprises a cylindrical wall extending axially from an annular flange, an inner diameter of the retaining sleeve is constant along an entire axial length of the retaining sleeve, an outer diameter of the retaining sleeve is larger along the annular flange than the cylindrical wall, the annular flange is configured to axially abut a first axial end of the expanding shoulder, the cylindrical wall is configured to extend inside of the expanding shoulder from the first axial end to an internal shoulder of the expanding shoulder, and the internal shoulder is disposed at an internal chamfer extending to a second axial end of the expanding shoulder.

2. The spring shoulder kit of claim 1, wherein the retaining sleeve defines an innermost circumference of the spring shoulder kit along the entire axial length of the retaining sleeve.

3. The spring shoulder kit of claim 1, wherein;

the finger is one of a plurality of fingers radially arranged about a longitudinal axis of the expanding shoulder; and the wedge is one of a plurality of wedges, each wedge of the plurality of wedges respectively outwardly radially extending from at least one of the plurality of fingers.

4. The spring shoulder kit of claim 1, wherein the wedge has an upper chamfer connected to a lower side.

5. The spring shoulder kit of claim 1, wherein the finger has a lead-in feature configured to facilitate insertion of the retaining sleeve into the expanding shoulder.

6. The spring shoulder kit of claim 1, wherein the wedge is circumferentially wider than the finger.

7. The spring shoulder kit of claim 1, wherein the cylindrical wall of the retaining sleeve slidably engages the finger during an axial movement of the retaining sleeve into an inserted position within the expanding shoulder, and the retaining sleeve is configured to outwardly radially bias the finger in the inserted position of the retaining sleeve within the expanding shoulder.

8. The spring shoulder kit of claim 7, wherein, in a locked state, an end of the cylindrical wall of the retaining sleeve abuts the internal shoulder of the expanding shoulder.

9. The spring shoulder kit of claim 7, wherein the outer diameter of the cylindrical wall is sized to engage a tip of the finger when the expanding shoulder is in a compressed state.

10. The spring shoulder kit of claim 7, wherein when the expanding shoulder is in a compressed state within the collar, the retaining sleeve is useable as a tool to axially push the expanding shoulder along the inner wall of the collar until the wedge snaps into the groove defined in the inner wall of the collar, followed by the axial movement of the retaining sleeve into the expanding shoulder to block radial movement of the finger and the wedge.

11. The spring shoulder kit of claim 7, wherein, in a locked state within the collar, the annular flange of the retaining sleeve abuts a tip of the finger.

12. The spring shoulder kit of claim 1, wherein the finger is thinner in wall thickness than the ring.

13. The spring shoulder kit of claim 1, wherein the wedge acts as a lead-in feature configured to facilitate insertion of the expanding shoulder into the collar.

14. The spring shoulder kit of claim 1, wherein, when moving from a relaxed state to a locked state, the wedge moves radially outwardly relative to a longitudinal axis of the expanding shoulder.

15. A collar assembly comprising:

a collar configured to be disposed in a wellbore, the collar including an inner wall defining a groove; and a spring shoulder kit selectively removably placeable within the collar disposed in the wellbore, the spring shoulder kit including:

an expanding shoulder insertable into the inner wall of the collar disposed in the wellbore, the expanding shoulder including:

a ring;

a finger axially extending from and flexibly pivotable relative to the ring, the finger having a first end; and a wedge outwardly radially extending from the finger at the first end, the wedge being configured to matingly radially outwardly snap into the groove defined in the inner wall of the collar; and a retaining sleeve slidably insertable into the expanding shoulder along the finger to block inward radial movement of the wedge, wherein the spring shoulder kit is configured to support an axial load of an internal assembly in the collar disposed in the wellbore, and the spring shoulder kit is configured to be positioned completely inside the collar between opposite axial ends of the collar, and wherein the retaining sleeve comprises a cylindrical wall extending axially from an annular flange, an inner diameter of the retaining sleeve is constant along an entire axial length of the retaining sleeve, an outer diameter of the retaining sleeve is larger along the annular flange than the cylindrical wall, the annular flange is configured to axially abut a first axial end of the expanding shoulder, the cylindrical wall is configured to extend inside of the expanding shoulder from the first axial end to an internal shoulder of the expanding shoulder, and the internal shoulder is disposed at an internal chamfer extending to a second axial end of the expanding shoulder.

16. The collar assembly of claim 15, wherein the annular flange is slidably insertable along the inner wall of the collar.

17. The collar assembly of claim 15, wherein when the expanding shoulder is in a locked state with the wedge snapped into the groove, the retaining sleeve abuts the internal shoulder of the expanding shoulder.

18. A method comprising:

axially inserting an expanding shoulder of a spring shoulder kit into an inner wall of a collar disposed in a wellbore until a wedge of the expanding shoulder radially outwardly snaps via a radially flexible finger into an internal groove defined in the inner wall of the collar; and inserting a retaining sleeve of the spring shoulder kit into the expanding shoulder until the retaining sleeve contacts an internal shoulder of the expanding shoulder to outwardly radially hold the wedge in the internal groove, wherein the retaining sleeve has a radially outwardly extending flange slidably insertable along the inner wall of the collar, wherein the spring shoulder kit is configured to support an axial load of an internal assembly in the collar disposed in the wellbore, and the spring shoulder kit is configured to be positioned completely inside the collar between opposite axial ends of the collar.

19. The method of claim 18, wherein the wedge matingly fits into the internal groove.

* * * * *